(12) United States Patent
Lee

(10) Patent No.: US 7,370,218 B2
(45) Date of Patent: *May 6, 2008

(54) PORTABLE COMPUTER POWER CONTROL APPARATUS AND METHOD

(75) Inventor: Jin-hyung Lee, Bucheon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 250 days.

This patent is subject to a terminal disclaimer.

(21) Appl. No.: 10/823,736

(22) Filed: Apr. 14, 2004

(65) Prior Publication Data

US 2004/0250144 A1   Dec. 9, 2004

(30) Foreign Application Priority Data

Jun. 7, 2003   (KR) .................. 10-2003-0036594

(51) Int. Cl.
*G06F 1/26* (2006.01)
(52) U.S. Cl. .................. 713/320; 361/1; 361/683
(58) Field of Classification Search ............... 713/320; 361/1, 683
See application file for complete search history.

(56) References Cited

U.S. PATENT DOCUMENTS 5,052,106 A * 10/1991 Labrijn .................. 30/34.1
5,303,171 A    4/1994 Belt et al.
6,122,152 A * 9/2000 Goto et al. ................ 361/1
6,243,819 B1 * 6/2001 Jung ........................ 713/320
6,535,380 B1 * 3/2003 Lee et al. .................. 361/683
6,587,714 B2 * 7/2003 Tanida ...................... 600/547
6,704,194 B2 * 3/2004 Koo .......................... 361/683
6,924,791 B1 * 8/2005 Nicolas et al. ............ 345/179

FOREIGN PATENT DOCUMENTS

JP     05-290662    * 11/1993    .............. 713/320
JP     2000-3230      1/2000
JP     2000-137549    5/2000
KR     94-25368      11/1994

* cited by examiner

*Primary Examiner*—Chun Cao
*Assistant Examiner*—Vincent T Tran
(74) *Attorney, Agent, or Firm*—Staas & Halsey LLP

(57) ABSTRACT

The present invention relates to a portable computer including a main body, a display rotatably connected to the main body, a latching portion provided in one of the main body and the display part, a latch member provided in the other one of the main body and the display and movable between a latching position, wherein the latch member is latched in the latching part and the display is prevented from opening, and a releasing position, where the latch member is released from the latching portion, a latch switch contacting the latch member if the latch member is at the releasing position, and a controller supplying electric power to a system of the computer if the latch switch generates a contact signal.

10 Claims, 8 Drawing Sheets

PORTABLE COMPUTER POWER CONTROL APPARATUS AND METHOD

CROSS-REFERENCE TO RELATED APPLICATIONS

This application claims the benefit of Korean Patent Application No. 2003-36594, filed Jun. 7, 2003, in the Korean Intellectual Property Office, the disclosure of which is incorporated herein by reference.

BACKGROUND OF THE INVENTION

1. Field of the Invention

The present invention relates to a portable computer, and more particularly, to a portable computer wherein supply of electric power for the portable computer is controlled by moving a latch member provided in a main body or display part of the portable computer.

2. Description of the Related Art

As shown in FIGS. 1 and 2, portable computers generally include a main body 100 and a display part 200 opening/closing access to an upper surface of the main body 100.

Within the main body are the portable computer components, such as a main board (not shown), CPU (not shown), and the like. In addition, typically, the upper surface of the main body 100 includes a key board 130, a touch pad 120, a main power switch 110 and the like. Along a front end portion of the upper surface, of the main body 100, there is also typically provided a latching part 140, to latch a latch member 230 of the display part 200 (to be described in more detail below).

The display part 200 typically includes an LCD (Liquid Crystal Display) 210 for displaying an image, e.g., the desktop image for the portable computer's operating system. The free end of the display part 200 includes the latch member 230, capable of being latched in and released from the latching part 140, in a closed state of the display part 200, thereby contacting display part 200 to the upper surface of the main body 100. The latch member 230 typically further includes an operating knob 220 for moving the latch member 230 to/from a releasing position.

In the conventional portable computer, to supply electric power to the computer system, two operations are needed: a user must open the display part 200, relative to the main body 100, and then push a main power switch 110 provided on a surface of the main body 100. However, it is more convenient, if a user can supply electric power to the computer system with only one operation.

SUMMARY OF THE INVENTION

Accordingly, it is an aspect of the present invention to provide a portable computer in which supply of electric power is controlled based on a movement of a latch member provided in a main body or the display.

Additional aspects and advantages of the invention will be set forth in part in the description which follows and, in part, will be obvious from the description, or may be learned by practice of the invention.

To accomplish the above and/or additional aspects and advantages, embodiments of the present invention provide a portable computer, including a main body, a display rotatably connected to the main body, a latching portion provided in one of the main body and the display, a latch member provided in the other one of the main body and the display, opposing the latching portion, and movable between a latching position, where the latch member is latched in the latching portion such that the display is prevented from opening, and a releasing position, where the latch member is released from the latching portion, a latch switch adjacent to the latch member, such that the latch switch contacts the latch member and generates a contact signal when the latch member is at the releasing position, and a controller supplying electric power to a system of the computer if the latch switch generates a contact signal.

To accomplish the above and/or additional aspects and advantages, embodiments of the present invention provide a method of powering a computer, with the computer having a main body rotatably connected to a display and a latch for latching the main body and the display together, including moving a latch member of the latch from a latching position to a releasing position, and initiating a powering of the computer when the latch member is at the releasing position.

To accomplish the above and/or additional aspects and advantages, embodiments of the present invention provide a method of powering a computer, with the computer having a main body rotatably connected to a display and a latch for latching the main body and the display together, including moving a latch member of the latch from a latching position to a releasing position, and initiating a shutdown of the computer when the latch member is at the releasing position.

BRIEF DESCRIPTION OF THE DRAWINGS

The above and/or other aspects and advantages of the present invention will become apparent and more readily appreciated from the following description of the embodiments, taken in conjunction with the accompanying drawings of which.

DETAILED DESCRIPTION OF THE PREFERRED EMBODIMENT

Figure 1:
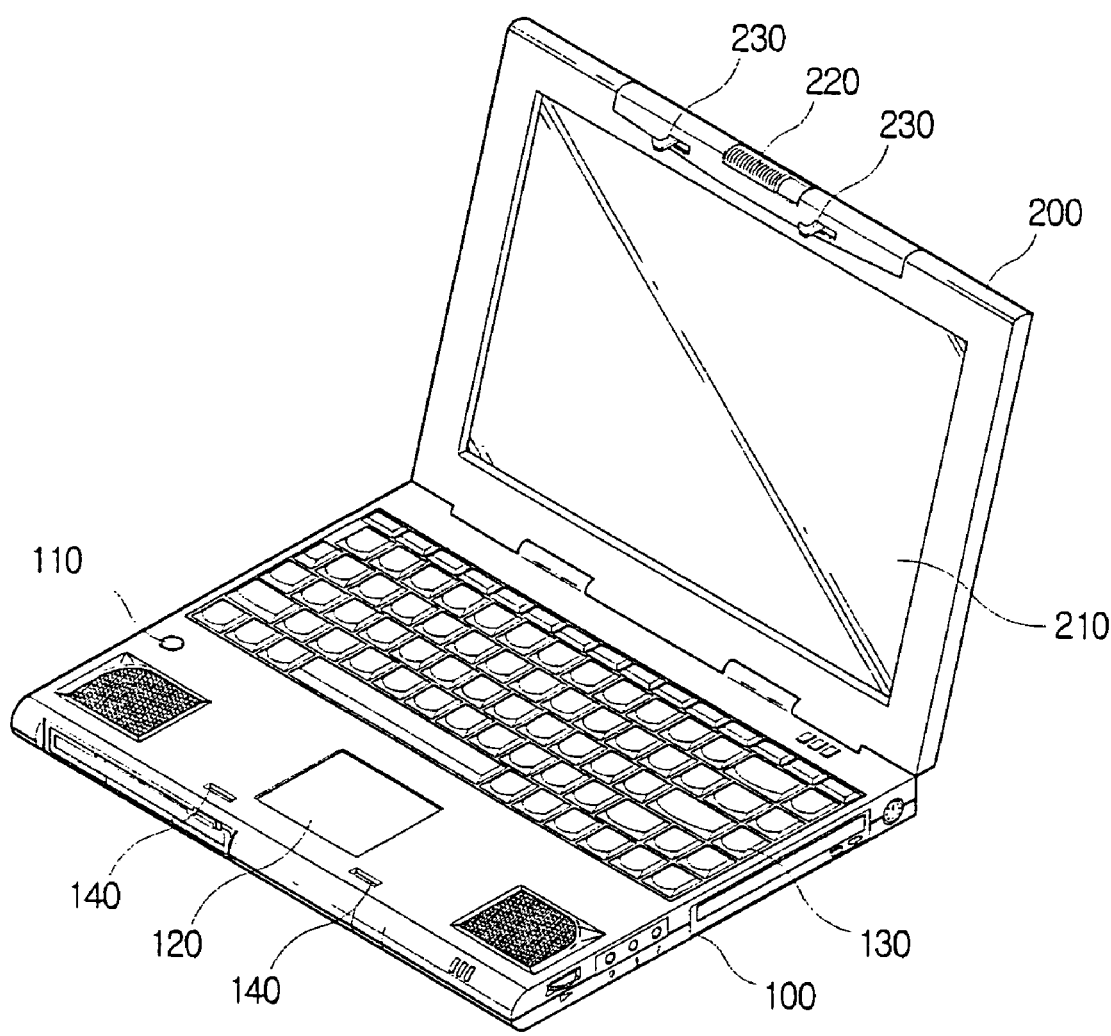
FIG. 1 is a perspective view of a conventional portable computer.
Figure 2:
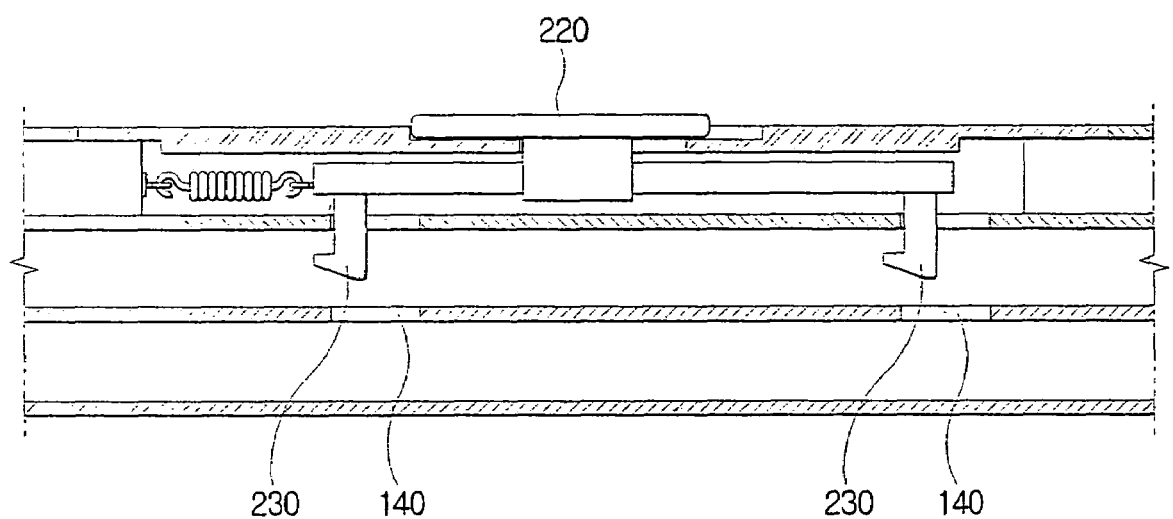
FIG. 2 is an enlarged sectional view of a latch part and a latching hole of the conventional portable computer of FIG. 1.

Reference will now be made in detail to embodiments of the present invention, examples of which are illustrated in the accompanying drawings, wherein like reference numerals refer to like elements throughout.

Figure 3:
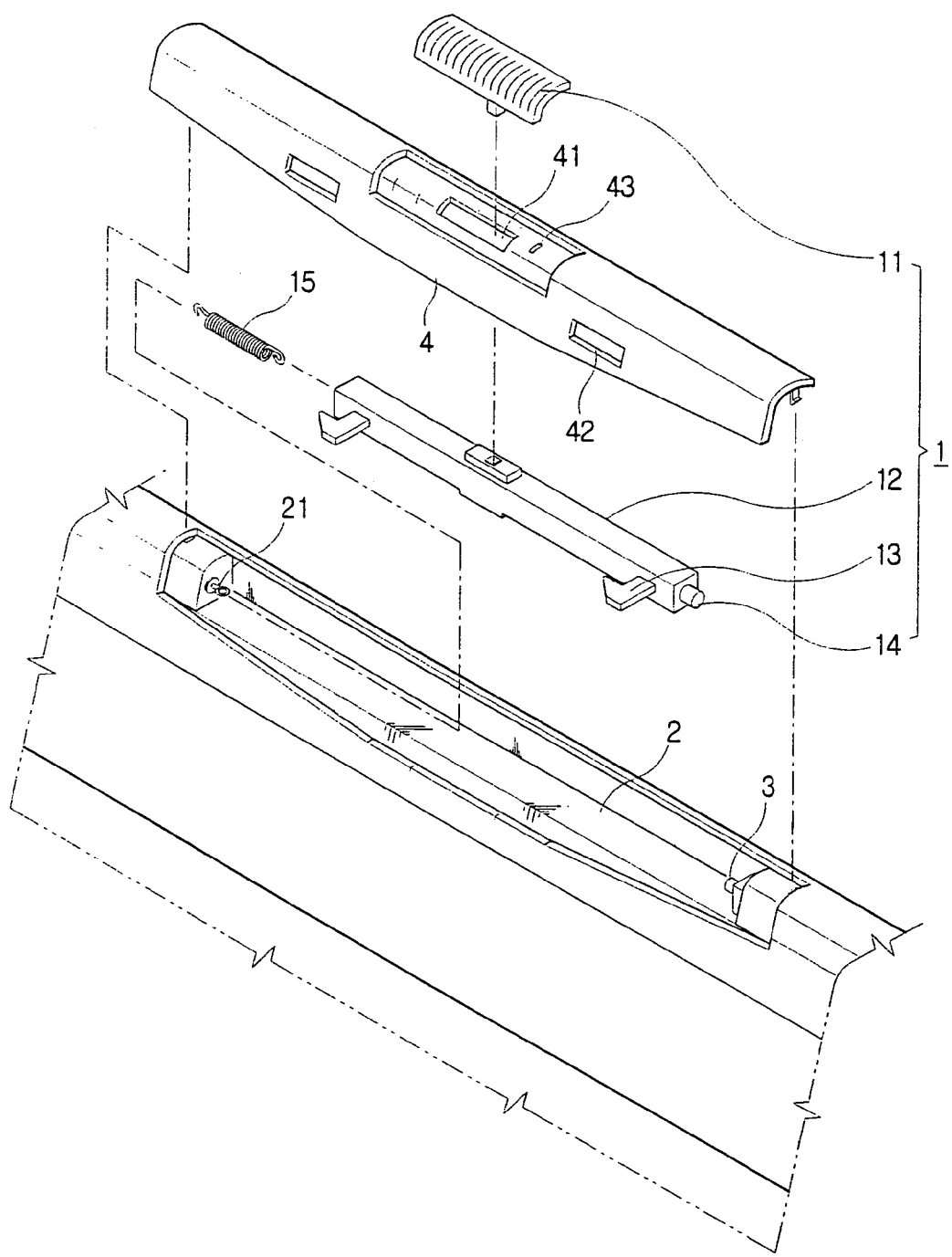
FIG. 3 is an exploded perspective view of a latch part and a latching hole of a portable computer, according to an embodiment of the present invention.

FIG. 3 illustrates an exploded perspective view of latch part 1 and a latch power switch 3 of a portable computer, according to an embodiment of the present invention. As illustrated in FIG. 3, the latch part 1 is provided in the middle of a free end part of a display part 200. A latch power switch 3 is provided in the display part 200 in a position corresponding to the latch part 1.

The latch part 1 can be oriented into a latch accommodating part 2, formed in the middle of a free end of the display part 200, with a latch cover 4 of the latch part 1 covering the latch accommodating part 2. Latch member 12, accommodated in the latching part 140, can be externally operated, e.g., by an operation knob 11, and moved between a latching position (the position A in FIG. 4) and a releasing position (the position B in FIG. 5). Within the latch part 1, a spring 15 elastically pushes the latch member 12 in a direction of the latching position.

Within the latch accommodating part 2 there is a groove, of a predetermined length, along a longitudinal direction of the display part 200. In addition, on one side of the latch accommodating part 2 there is provided a first spring connection loop 21, to connect the latch accommodating part 2 of the display part 200 with one end of the spring 15 of the latch part 1.

FIG. 3 further illustrates operation knob 11, exposed to the outside of the latch cover 4, and connected to the latch member 12, to move the latch member 12 between the latching position (the position A in FIG. 4) and the releasing position (the position B in FIG. 4) within the latch accommodating part 2. The latch member 12 includes a latching hook 13, provided as a single body with the latch member 12, to be latched in and released from the latching part 140 (illustrated in FIGS. 4-7). On one side of the latch member 12, there is provided a second spring connecting loop 16 connected with the other end of the spring 15, as illustrated in FIGS. 4-7. On the other side of the latch member 12, there is a pushing protrusion 14 for contacting with the latch switch 3, which will be described in greater detail below. The pushing protrusion 14 can protrude from the latch moving member 12 for a predetermined length.

The latch cover 4 includes a guide hole 41, of a sufficient length to guide an alternated movement of the latch member 12 and a hook through hole 42, also of a sufficient length to permit the latching hook 13 to pass. The guide hole 41 and hook through hole 42 are long enough that the latching hook 13 can be moved between the latching position (the position A in FIG. 4), positioned on one side of the longitudinal direction of the latch cover 4, and the releasing position (the position B in FIG. 5), positioned on the other side of the longitudinal direction of the latch cover 4, when the display part 200 is opened and/or closed.

Figure 7:
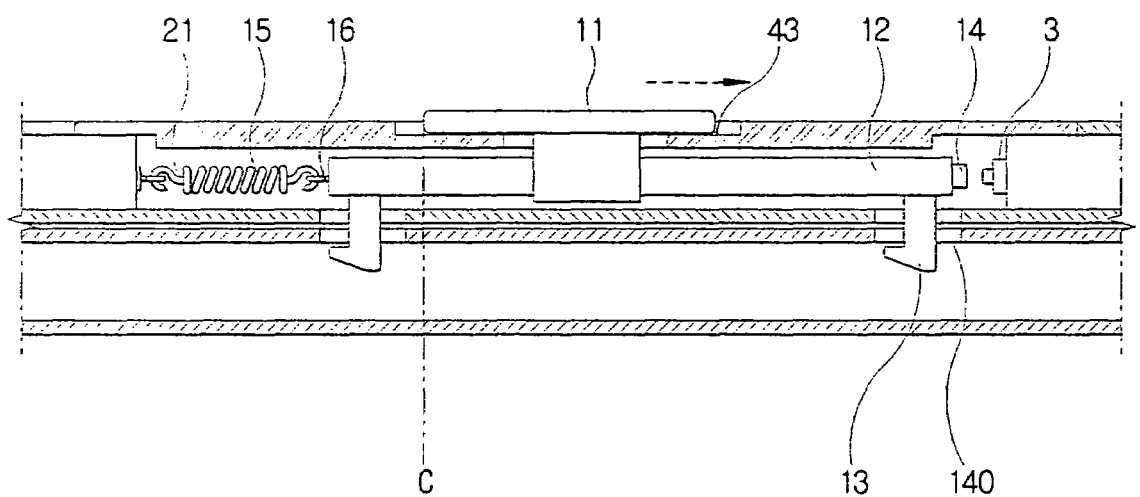

At a predetermined position, adjacent to the guide hole 41 a protruding part 43 is formed, with the protruding part 43 protruding in a transverse direction relative to a movement of the operation knob 11 so that a user can perceive that the latch member 12 is positioned at an intermediate position between the latching and releasing positions (the position C in FIG. 7)

As illustrated in FIG. 3, the latch switch 3 is provided at one side of the latch accommodating part 2, corresponding to the pushing protrusion 14 of the latch moving member 12. Here, the latch switch 3 is provided in the latch accommodating part 2, such that the pushing protrusion 14 does not contact the latch switch 3 if the latch member 12 is positioned at the intermediate position (position C in FIG. 7) between the latching and releasing positions 7)].

As illustrated in FIG. 1, a main power switch 110 can be provided on a surface of the main body 100. Thus, a computer system can be turned on/off also with the main power switch 110. Therefore, the portable computer according to an embodiment of the present invention can be considered as being provided with a plurality of power switches from which the computer system can be turned on/off.

Figure 8:
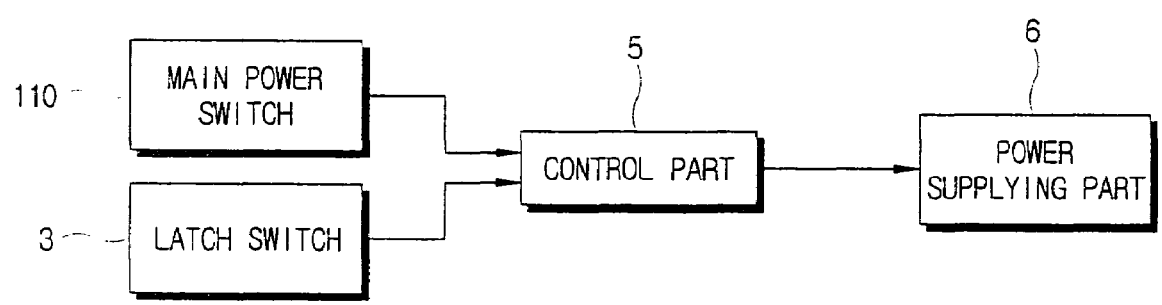
FIG. 8 is a block diagram of a control part controlling supply of electric power for the portable computer, according to an embodiment of the present invention.

As illustrated in FIG. 8, a control part 5 can be provided to control a power supplying part 6 to supply or cut off electric power of the computer system by receiving control signals generated from the main power switch 110 or from the latch switch 3.

When the computer system is turned off, the control part 5 controls the power supplying part 6 to supply electric power to the computer system if a power on signal from the main power switch 110 or the latch switch 3 is transmitted to the control part 5. When the computer system is turned on, the control part 5 controls the power supplying part 6 to cut off electric power of the computer system if a power off signal from the main power switch 110 or the latch switch 3 is transmitted to the control part 5.

Figure 4:
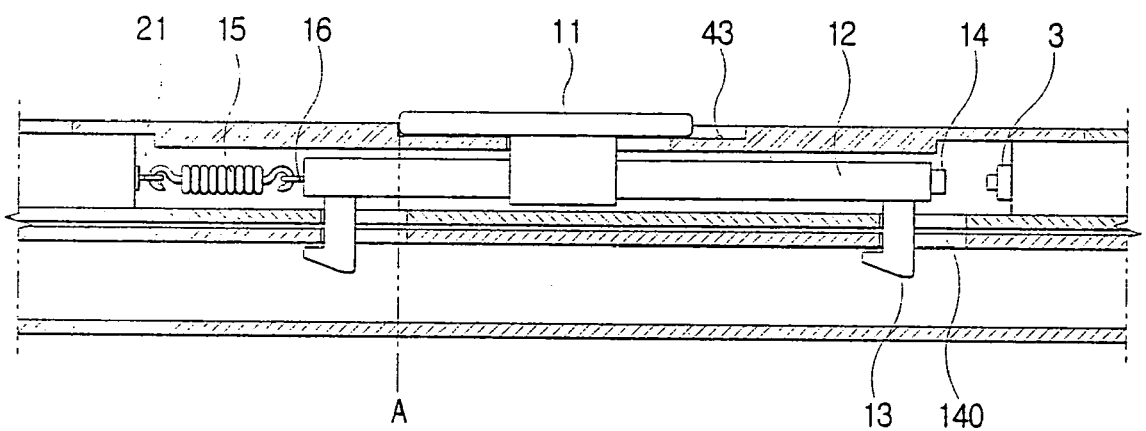
FIGS. 4 through 7 are sectional views illustrating operations of a latch part and a latch power switch part, according to embodiments of the present invention.
Figure 5:
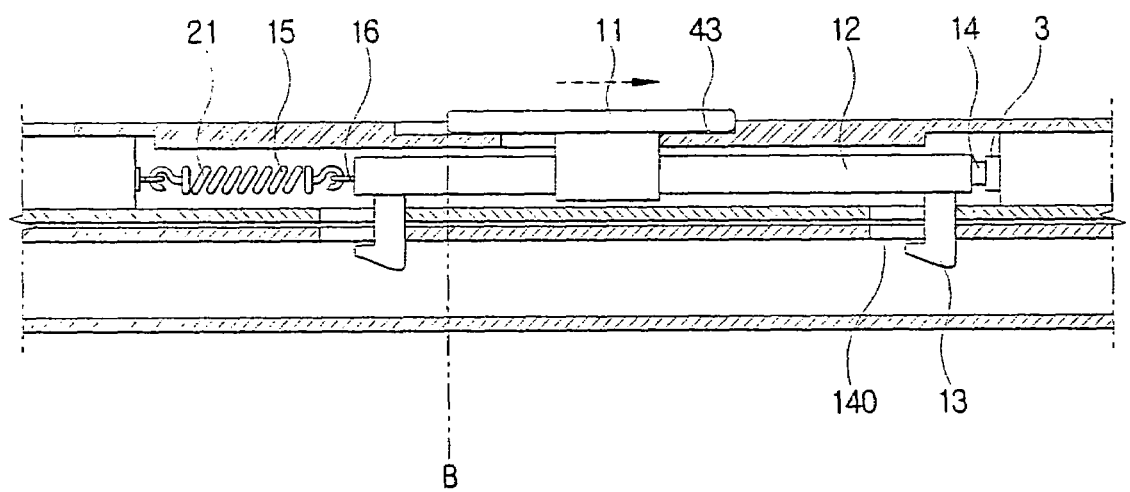

FIGS. 4, 5 and 7 illustrate the latch member 12 positioned at the latching position (position A), the releasing position (position B), and the intermediate position between the latching and releasing positions (position C), respectively.

To supply electric power to the computer system, with the display part 200 being open relative to the main body 100, a user may press the main power switch 110 or move the latch member to the releasing position (the position B in FIG. 5) by moving the operation knob 11, so that the pushing protrusion 14 comes into contact with the latch switch 3. While the latch member 12 is being moved in the intermediate position between the latching and releasing positions (the position C in FIG. 7), the operating knob 11 only needs to be moved with the force with which the obstruction of the protruding part 43 is overcome. Here, the control part 5 controls the power supplying part 6 to supply electric power to the computer system by receiving one of the signals from the main power switch 110 or from the latch switch 3.

Figure 6:
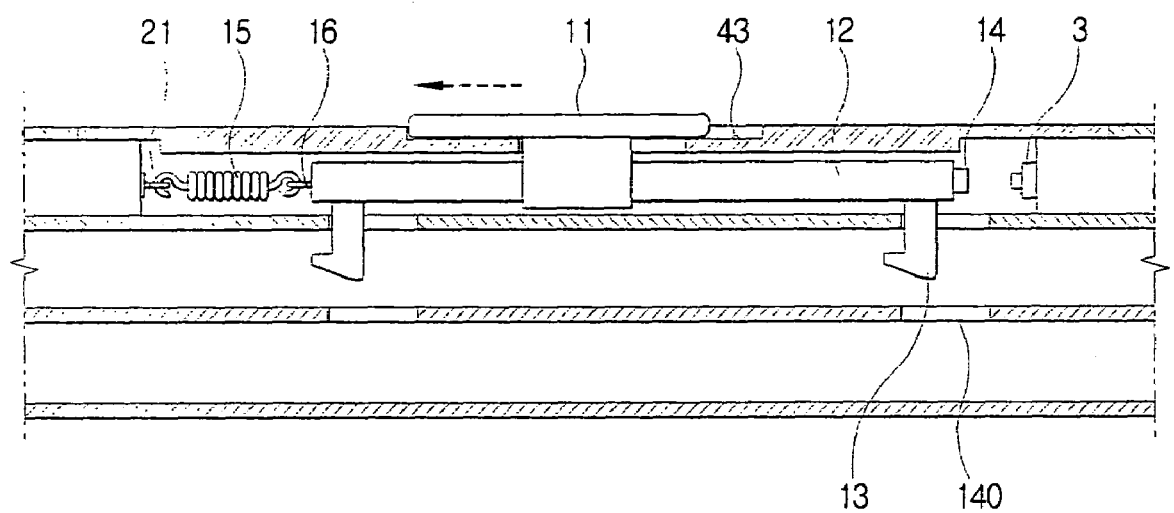

To open the display part 200, from a closed position, and supply electric power to the computer system, a user may move the operating knob 11 to the releasing position (the position B in FIG. 5), and open the display part 200 relative to the main body 100. Then, the pushing protrusion 14 contacts the latch switch 3. While the latch member is being moved through the intermediate position, between the latching and releasing positions, the operating knob 11, similarly, only needs to be moved with the force with which the obstruction of the protruding part 43 is overcome. The control part 5 thereafter controls the power supplying part 6 to supply electric power to the computer system by receiving the signal from the latch switch 3, the latch member 12 is then released from the latching part 140, and the display part 200 is thereby opened, as illustrated in FIG. 6.

To open the display part 200 without supplying electric power to the computer system, a user may move the operating knob 11 to the intermediate position, between the locking and releasing positions, and open the display part 200. In this case, the protruding part 43 provided on the latch cover 4 obstructively contacts to the operating knob 11 of the latch member 12, thereby preventing the latch member 12 from moving. The latch member 12 is thereby released from the latching part 140, but the pushing protrusion 14 does not contact to the latch switch 3. Therefore, the display part 200 can be opened without supplying electric power to the computer system.

To supply electric power to the computer system without opening the display part 200, a user may move the operating knob 11 to the releasing position (position B in FIG. 5) while closing the display part 200, and thereafter release operating knob 11. Here, the pushing protrusion 14 of the latch member 12 will contact the latch switch 3 and the latch member 12 moves to the latching position (position A in FIG. 4), so that electric power is supplied to the computer system, while the display part 200 continues to be closed.

To cut off electric power of the computer system, the same process used for supplying electric power, as described above, can similarly be applied.

In the above embodiment, two of the latching hooks 13 of the latch member 1 are provided. Alternatively, only one latching hook 10 may be provided in the latch member 1.

As describe above, embodiments of the present invention provide for control of supply of electric power for the computer system by moving the latch member.

Although a few embodiments of the present invention have been shown and described, it will be appreciated by those skilled in the art that changes may be made in these embodiments without departing from the principles and spirit of the invention, the scope of which is defined in the appended.

What is claimed is:

1. A computer, comprising:
  a main body;
  a display rotatably connected to the main body;
  a latch member movable between closed and release latching positions, wherein when the latch member is in the closed position the display is prevented from rotatably moving to an orientation allowing for viewing of the display by a user of the computer;
  a latch switch generating a contact signal when the latch member is at the releasing position; and
  a controller supplying electric power to the computer if the latch switch generates a contact signal,
  wherein when the latch member is at an intermediate position between the closed and release positions the display is rotatably movable to the orientation allowing for viewing of the display without the latch switch generating the contact signal.

2. The computer of claim 1, further comprising a latch cover with a protrusion protruding in a transverse direction from a predetermined movement zone of the latch member, to come into contact with the protrusion when the latch member transitions from the closed position to the intermediate position between the closed and releasing positions.

3. The computer of claim 1, further comprising a main power switch provided on the main body, wherein the controller supplies electric power to the computer if one of a turn-on signal from the main power switch and the contact signal from the latch switch is generated.

4. The computer of claim 1, further comprising a main power switch provided on the main body, wherein the controller supplies electric power to the computer if one of a turn-on signal from the main power switch and the contact signal from the latch switch is generated.

5. The computer of claim 2, further comprising a main power switch provided on the main body, wherein the controller supplies electric power to the computer if one of a turn-on signal from the main power switch and the contact signal from the latch switch is generated.

6. The computer of claim 3, wherein the controller cuts off electric power of the computer if the latch switch generates the contact signal while electric power is being supplied to the computer.

7. The computer of claim 4, wherein the controller cuts off electric power of the computer if the latch switch generates the contact signal while electric power is being supplied to the computer.

8. The computer of claim 5, wherein the controller cuts off electric power of the computer if the latch switch generates the contact signal while electric power is being supplied to the computer.

9. The computer of claim 1, wherein when the display is latched to the main body, the display can be unlatched from the main body without the latch switch generating the contact signal.

10. A portable computer, comprising:
  a main body;
  a display rotatable connected to the main body;
  a latching portion provided in one of the main body and the display;
  a latch member provided in the other one of the main body and the display, opposing the latching portion, and movable between a latching position, where the latch member is latched in the latching portion such that the display is prevented from opening, and a releasing position, where the latch member is released from the latching portion;
  a latch switch adjacent to the latch member, such that the latch switch contacts the latch member and generates a contact signal when the latch member is at the releasing position; and
  a controller supplying electric power to the computer if the latch switch generates the contact signal,
  wherein when the latch member is at an intermediate position between the latching and release positions the display is released to be rotatably movable to an orientation allowing for viewing of the display without the latch switch generating the contact signal.

* * * * *

UNITED STATES PATENT AND TRADEMARK OFFICE
CERTIFICATE OF CORRECTION

| | | |
|---|---|---|
| PATENT NO. | : 7,370,218 B2 | Page 1 of 1 |
| APPLICATION NO. | : 10/823736 | |
| DATED | : May 6, 2008 | |
| INVENTOR(S) | : Jin-hyung Lee | |

It is certified that error appears in the above-identified patent and that said Letters Patent is hereby corrected as shown below:

Column 6, Line 24, change "rotatable" to --rotatably--.

Signed and Sealed this

Sixteenth Day of September, 2008

JON W. DUDAS
*Director of the United States Patent and Trademark Office*